APPARATUS FOR DELETING A PORTION OF A SIGNAL

Filed May 15, 1967 3 Sheets-Sheet 1

INVENTOR.
WILSON P. BOOTHROYD
BY Peter Xiarhos
AGENT.

APPARATUS FOR DELETING A PORTION OF A SIGNAL

INVENTOR.
WILSON P. BOOTHROYD
BY Peter Xiarhos
AGENT.

INVENTOR.
WILSON P. BOOTHROYD
BY Peter Xiarhos
AGENT.

3,541,264
APPARATUS FOR DELETING A PORTION OF A SIGNAL

Wilson P. Boothroyd, Carlisle, Mass., assignor to Sylvania Electric Products Inc., a corporation of Delaware Filed May 15, 1967, Ser. No. 638,217
Int. Cl. H04b *1/66*
U.S. Cl. 179—15.55 2 Claims

ABSTRACT OF THE DISCLOSURE

Audio compression system utilizing apparatus operable to periodically and repetitively delete discrete portions of a continuous stream of audio information sensed from an original recording played back at a speed accelerated from the original recording speed. The audio information, having a level of pitch higher than the level of pitch of the original recording, is applied to a multi-tapped delay line and sampled at each tap. Because of the rate of sampling and the delay provided by the delay line, the level of the pitch of the audio information applied to the delay line is lowered to the level of pitch of the original recording, and a plurality of discrete portions of the audio information are periodically and repetitively deleted therefrom, thereby permitting a reduction in the normal playback time of the original recording.

BACKGROUND OF THE INVENTION

The invention described in the instant application relates to apparatus for deleting a portion of a signal, and more particularly, to an audio compression system embodying such apparatus.

Normally, audio information, such as sound or connected speech, is recorded on magnetic recording tape, wire, or disc at a particular constant speed and the recording so formed reproduced by conventional playback apparatus at the original recording speed to recover the audio information. From the foregoing it follows that the pitch of the reproduction, that is, the highness or lowness of the sounds of the reproduction, and the tempo, are the same as the pitch and tempo of the original recording. Moreover, the time required to reproduce the original audio recording is equal to that spent in recording the audio information.

It has been found that the time normally required to reproduct or "play back" such an original audio recording may be shortened appreciably by repetitively and periodically deleting discrete portions of audio information therefrom. In one prior art audio compression system, exemplified by a United States patent to Fairbanks et al., Number 2,886,650, this shortening of playback time has been accomplished by periodically electrically deleting or removing individual discrete portions or fragments of an original recording, preparing a second recording devoid of the deleted portions, and thereafter playing back such second recording in the shortened period of time. The above-described shortening of the play back time has been possible because the portions which are removed from the original recording are individually of such a short interval that a sound, or in the case of connected speech, a recorded word, syllable, or even a sound in a syllable, generally is not lost.

SUMMARY

Like the Fairbanks et al. system and other systems of the same general nature, the apparatus of the present invention, when employed in an audio compression system, serves to repetitively and periodically delete very small portions of audio information whereby the playback time of an original recording may be shortened. A principal advantage of the instant invention is its essentially completely electronic nature. Thus, the requirements of plural recording heads, bulky mechanical moving elements, and synchronization apparatus for accurately and precisely timing the operation of such elements, as described in the Fairbanks et al. patent, for example, are avoided by the present invention. Additionally, because of the ready adaptability of the apparatus of the invention to existing recording and playback equipment without extensive modifications, and the simplified arrangement and operation of the elements comprising the invention, the apparatus of the present invention is particularly suited for use in the fields of education, speech and language research, and broadcasting.

Briefly, the apparatus of the invention for deleting a portion of a signal comprises a delay means, a plurality of output terminal means spaced along the delay means, a sampling means, and a signal converting means. In operation, a signal from which a portion is to be deleted is applied to an input of the delay means and propagated along the delay means. The signal increments appearing at the plurality of output terminal means as a result of the propagation of the applied signal are then sampled in sequence by the sampling means in the direction of the propagation of the applied signal at a frequency related to the amount of the portion of the applied signal to be deleted. In response to the sequential sampling operation, a plurality of sampled signals are provided by the sampling means, one signal for each sampling of an output terminal means coincident with the appearance of a propagated signal thereat.

A portion of the applied signal in the delay means, however, is never sampled for the reason that such portion does not appear at any of the taps coincident with the sampling of the taps. This portion of the applied signal in the delay means not sampled and therefore not appearing in the output signal is designated the "deleted" portion. The plurality of sampled signals produced where the above-mentioned coincidence exists are then converted by the signal converting means to a continuous output signal, such output signal being characterized by the absence of a portion of the applied signal.

The above-described apparatus for deleting a portion of a signal is particularly suitable for use in an audio compression system since, by deleting several very small portions of recorded audio information, the playback time of a recording can be shortened by any desired, yet reasonable, amount. When the above-described apparatus for deleting a portion of a signal is used in such an audio compression system, the signals applied to and propagated by the delay means take the form of audio information of a predetermined level of pitch, more specifically, a level of pitch established by accelerating the playback speed of a recording from the original recording speed by a predetermined amount. The specific amount of acceleration is established in accordance with the desired reduction of the playback time of the original recording. The audio information is treated in the delay means in the same manner as described above with the result that the audio output information provided by the above-described apparatus is characterized by a pitch lower than the predetermined level of pitch of the audio information applied to and propagated along the delay means, but of the same level of pitch as the level of pitch of the original recording. Moreover, the audio output information occurs in the same period of time as the audio input information.

DESCRIPTION OF THE PREFERRED EMBODIMENT

Figure 1:
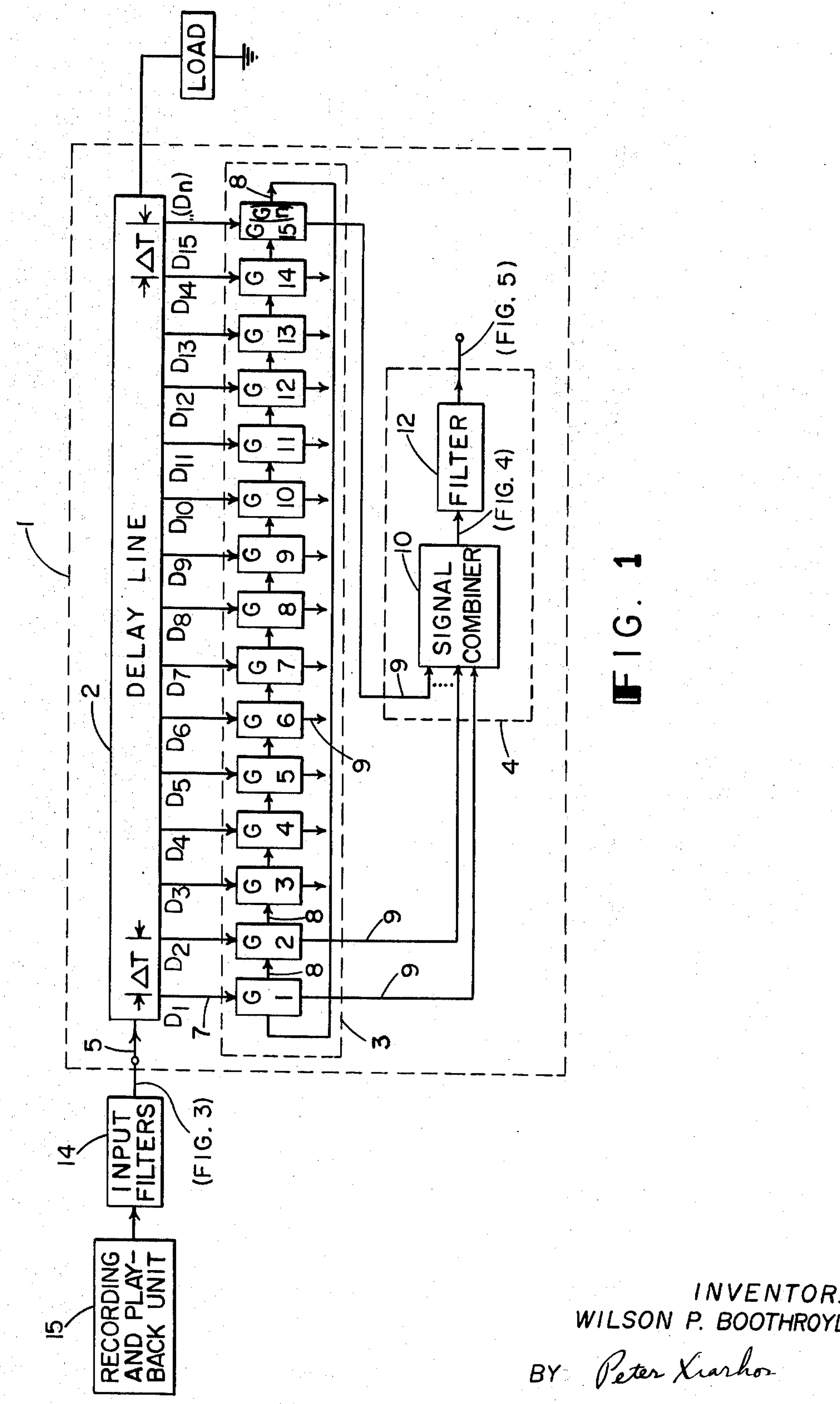
FIG. 1 is a block diagram of an audio compression system embodying the apparatus of the invention for deleting a portion of a signal.

Referring to FIG. 1, the apparatus for repetitively and periodically deleting a portion of a signal is shown generally at 1 and comprises an electrical delay line 2 having a plurality of *n* output taps $D_1 \ldots D_n$, the taps being separated by a duration $\Delta T$, a sampling arrangement 3, and a signal converting means 4. For the purposes of the system illustrated, $n=15$. The sampling arrangement 3 further comprises a plurality of gates $G_1 \ldots G_n$, each gate having an input line 7 connected to an associated output tap, a transfer line 8 connected to the next succeeding gate, and an output line 9. Each output line 9 is coupled to the signal converting means 4 which includes a signal combiner 10 and a filter 12. In FIG. 1, for the sake of simplicity, only three of the output lines 9 are shown coupled to the signal converting means 4.

In addition to the apparatus 1, FIG. 1 further illustrates in block diagram form an audio compression system of the invention. As shown, the audio compression system comprises the previously-described apparatus 1, a recording and playback unit 15, and input filters 14. The unit 15 and input filters 14 are coupled to the delay line 2 via the input line 5. The recording and playback unit 15 is adapted to provide the source of audio playback information as sensed from an original recording played back at a speed accelerated from the original recording speed as previously mentioned. The input filters 14 are provided for eliminating any input frequencies which might cause undesirable sampling products.

The operation of the deletion apparatus 1 and the audio compression system of FIG. 1 will now be described in conjunction with FIGS. 2 through 5.

Figure 2:
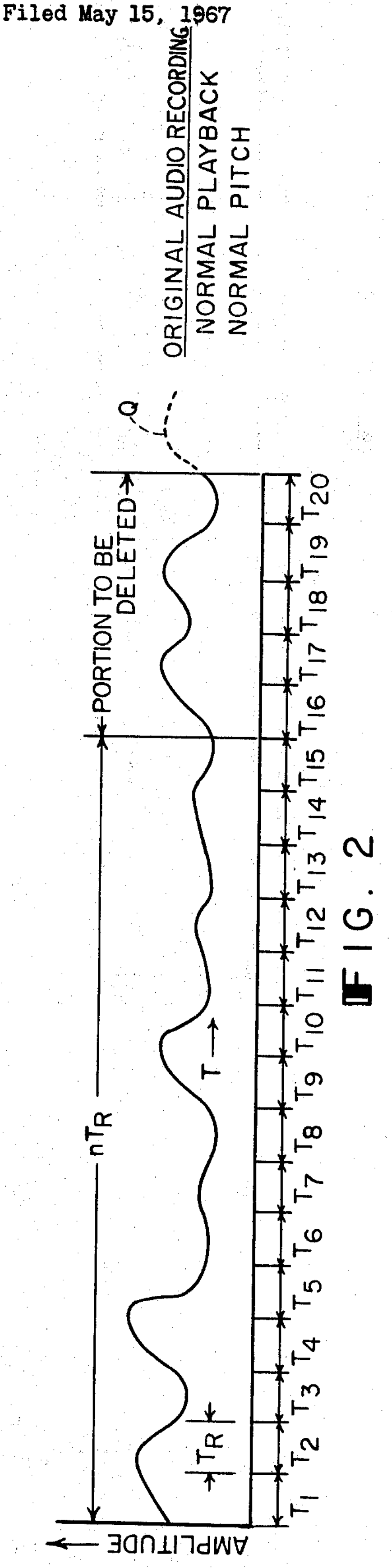
FIG. 2 is an amplitude-time waveform of a segment of audio speech information as sensed from an original audio recording reproduced at the original recording speed and characterized by normal pitch.

FIG. 2 illustrates the waveform of a segment of audio information as sensed by a playback head from an original audio recording contained in the unit 15 and played back at the same speed at which the audio information was recorded, that is, at normal playback speed. The time base of the waveform is divided into a plurality of equally-spaced time intervals $T_1 \ldots T_{20}$, the duration of $T_R$ of each interval being established in accordance with well known sampling techniques to be less than one-half the period of the highest frequency component of the audio information. A portion of the audio information to be deleted, constituting one-quarter of the entire segment of information is shown between the intervals $T_{16}$ and $T_{20}$. The duration of the portion $nT_R$ in FIG. 2 should be longer than the period of the lowest audio frequency to be reproduced. Thus, *n* should be greater than twice the ratio of the highest audio frequency and the lowest audio frequency output of the playback unit 15. The designation Q in FIG. 2 and in the following figures represents a succeeding portion of a segment of audio information.

Figure 3:
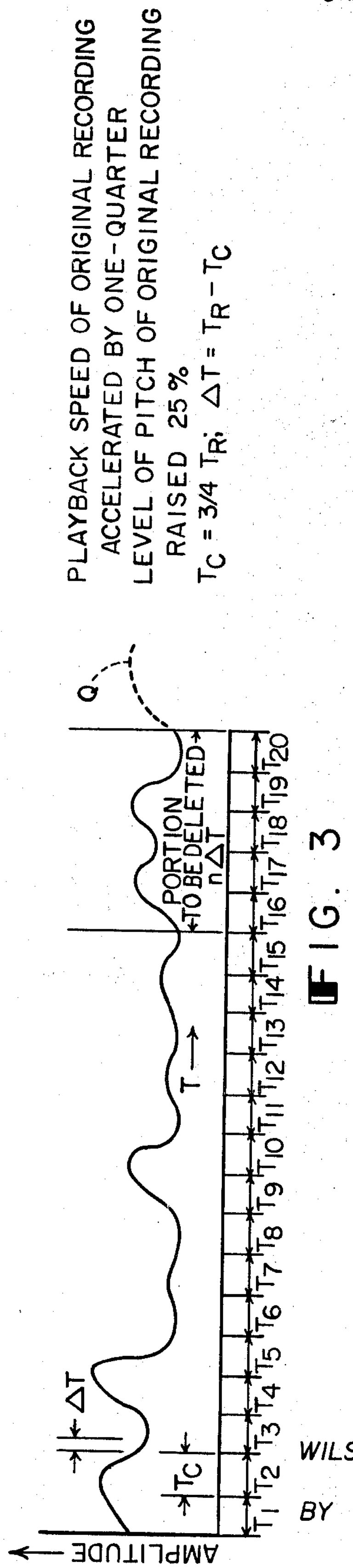
FIG. 3 is an amplitude-time waveform of a segment of audio speech information as sensed from an audio recording reproduced at a speed accelerated one-quarter from the original recording speed, and characterized by a 25 percent increase in pitch from the level of the pitch of the original recording.

Assume now that it is desired to delete the one-quarter portion of the segment of information of FIG. 2 appearing during the intervals $T_{16} \ldots T_{20}$, whereby a reduction of one-quarter in the playback time of the originally recorded audio information may be realized. To accomplish this desired result, it is necessary to increase the playback speed of the original recording contained in the unit 15 of FIG. 1 by one-quarter, to sense the audio information from the recording at the increased speed, and to apply the sensed audio information to the input line 5 of the delay line 2. The waveform of a segment of such audio information obtained upon accelerating the playback speed of the original recording by one-quarter is illustrated in FIG. 3. As expected, the FIG. 3 segment is characterized by a twenty-five percent increase in pitch from the level of the pitch of the segment of original audio information of FIG. 2. That is, by accelerating the playback speed by one-quarter, each interval $T_R$ of the waveform of FIG. 2 is shortened by a quarter. Such a shortened interval is shown as $T_C$ in FIG. 3. The amount by which the interval is shortened is defined as $\Delta T$, where $\Delta T$ is equal to $T_R - T_C$.

To effect deletion of the portion of the audio information appearing between the time intervals $T_{16}$ and $T_{20}$, and to normalize the level of pitch of the segment of the audio information of FIG. 3 to the level of pitch of the segment of audio information of FIG. 2, the delay line 2 is provided with fifteen taps, one tap corresponding to each of the time intervals $T_1$ to $T_{15}$ in FIG. 3. Each tap is separated by the duration of $\Delta T$ of a value as determined above from the relationship of $T_C$ to $T_R$.

The segment of audio information shown in FIG. 3 is applied to the input line 5 and propagated along the delay line 2. The propagated segment is sampled by the sampling arrangement 3 at each of the fifteen delay line taps $D_1 \ldots D_{15}$. As shown by the transfer line 8, the direction of sampling is the same as the direction of propagation of the audio segment. At fifteen time intervals $T_R$, fifteen sampled signals are provided by the sampling arrangement 3. However, no sampled signals are provided during the portion $T_{16} \ldots T_{20}$ inasmuch as the gate $G_{15}$ ($G_n$) reinitiates operation of the gate $G_1$ by its associated transfer line 8 after sampling of the fifteenth interval and before sampling of the audio information between $T_{16}$ and $T_{20}$ can ever take place. That is, although the portion of audio information appearing during the intervals $T_{16} \ldots T_{20}$ is in the delay line, there is no coincidence between the presence of such portion $T_{16} \ldots T_{20}$ at any of the taps and a sampling of the taps. Instead, the information appearing between $T_{15}$ and $T_{20}$, together with the other portions of the applied segment of audio information is absorbed by a non-reflecting load impedance terminating the end of the delay line 2 in a conventional manner. The portion $T_{16} \ldots T_{20}$, therefore, is designated the "deleted" portion and has a duration equal to *n* times $\Delta T$ or, in above-described example, $15\Delta T$. The result of the sequential sampling operation is illustrated by FIG. 4.

Figure 4:
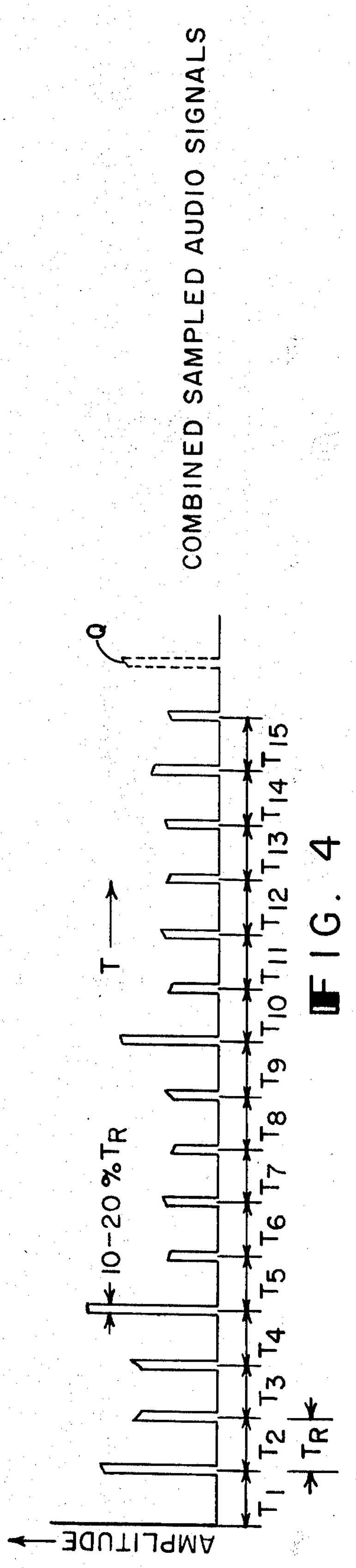
FIG. 4 is the waveform of a composite signal derived by combining the sampled signals resulting from the sampling of the segment of audio information shown in FIG. 3 with the sampling arrangement included in the apparatus of FIG. 1.

As shown in FIG. 4, the individual sampled signals from the gates $G_1 \ldots G_{15}$, separated by a value or $T_R$ (or $T_C+\Delta T$), have amplitudes corresponding to the amplitudes of the sampled portions of the propagated segment of audio information of FIG. 3 and widths equal to approximately 10% to 20% of the value of the duration $T_R$. The 10% to 20% figure is achieved by constructing the gates $G_1 \ldots G_{15}$ in a known manner to permit passage of sampled signals to the gate output lines 9 only during the 10% to 20% time period. Each sampled signal is applied to the signal combiner 10 which serves to combine the individual sampled signals of FIG. 4 to a composite serial train of pulses. The composite signal, in wide-band form, is thereupon applied to the low pass filter 12 which serves to filter out the sampling frequency of the sampling arrangement 3 and to provide a continuous audio output information having a smooth configuration to suitable output apparatus. The waveform of a segment of such audio output information is shown in FIG. 5.

Figure 5:
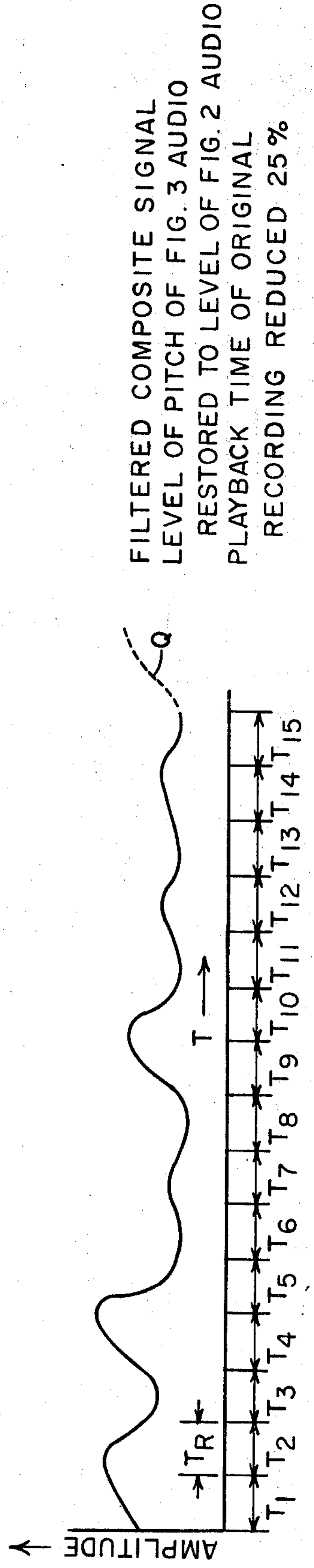
FIG. 5 is an amplitude-time waveform of the composite signal shown in FIG. 4 after filtering, and characterized by a level of pitch which is the same as the level of the pitch of the segment of audio information shown in FIG. 2 and occurring in the same period of time as the segment of audio information of FIG. 3.

It may be noted from FIG. 5 that the pitch of the segment of audio output information is the same as the pitch of the segment of audio information illustrated in FIG. 2. That is, the intervals T are of the same duration. This result obtains from the fact that the audio information of FIG. 3 is sampled at intervals $T_R$, the interval $T_R$ being greater than the interval $T_C$ by $\Delta T$. Also, it may be noted from FIG. 5 that the segment of audio output information has the same configuration as the waveform of FIG. 2 with the exception that the portion of the audio information appearing between intervals $T_{16}$ and $T_{20}$, FIG. 2, is not present in FIG. 5.

It should now be obvious that if a continuous stream of audio information as sensed from a playback head from an original recording at an accelerated playback speed is applied to the input line 5, a very small portion thereof, each portion being equal to $n$ times $\Delta T$, is removed during each cycle of sampling of the delay line taps. Thus, as shown in FIG. 5, the succeeding segment of audio information indicated by Q, appears immediately after the interval $T_{15}$. Accordingly, the audio output information appearing at the output of the signal converter 4 represents a condensed version of the original audio recording. Such version, when applied to a headset or loudspeaker apparatus, is increased in tempo from the tempo of the original recording and is therefore played back in a period of time shorter than the playback time of the original recording.

CONCLUSION

A specific apparatus has been described having a capability of deleting a specific portion of a signal, namely, the portion appearing between intervals $T_{16}$ and $T_{20}$ in FIG. 2. However, it is to be understood that for certain applications of the above-described apparatus of FIG. 1, it is possible by varying the duration of the time interval $T_R$ (and, therefore, the sampling frequency of the sampling arrangement), while maintaining $n$ and $\Delta T$ constant, to vary the pitch and both the amount and the location of a portion of an applied signal to be deleted.

The various elements comprising the apparatus of the invention are individually of a conventional nature. Thus, the electrical delay line 2 may be of the discrete component or carrier type, and may have movable output taps. The sampling arrangement may be of any type which provides a plurality of short duration sampled signals (10–20% of $T_R$) spaced apart by $T_R$. For example, a suitable sampling arrangement useful in the apparatus of the invention includes a plurality of diode gates operated by an external timing source at appropriate sampling intervals. The signal combiner 10 typically is a transistor linear amplifier having a resistive input associated with each sampled signal.

It will now be apparent that a novel apparatus for deleting a portion of a signal and an audio compression system have been disclosed in such full, clear, concise, and exact terms as to enable any person skilled in the art to which they pertain to make and use the same. It will also be apparent that various changes and modifications may be made in form and detail by those skilled in the art without departing from the spirit and scope of the invention. Therefore, it is intended that the invention shall not be limited except as by the appended claims.

What is claimed is:

1. Apparatus for deleting a portion of a signal having an aperiodic waveform comprising:

input means for providing an input signal having an aperiodic waveform;

delay means connected to the input means and adapted to receive and to propagate the input signal from the input means;

a plurality of output terminal means spaced along the delay means;

sampling means adapted to sequentially sample, in the direction of the propagation of the input signal and at a frequency related to the amount of the portion to be deleted and independent of the waveform of the input signal, the increments of said input signal appearing at said plurality of output terminal means coincident with the sampling of the output terminal means whereby a pluarity of sampled signals are provided by said sampling means;

said sampling means including a plurality of interconnected gate means, each gate means having an input line coupled to a corresponding output terminal means, a transfer line coupled to said conversion means;

each gate means being operable to sample an increment of the signal appearing at the output terminal means coupled to its input line and simultaneously produce a sampled signal at its output line proportional to the sampled increment, and being operable to cause operation of the next succeeding gate means at a predetermined time subsequent to its own sampling operation; and means operable independently of the waveform of the input signal for causing operation of the first one of the plurality of gate means subsequent to operation of the last one of the plurality of gate means whereby a new cycle of sequential sampling by the plurality of gate means is initiated; and conversion means adapted to convert said plurality of sampled signals to a continuous output signal.

2. Audio information compression apparatus comprising:

means for providing audio information of a predetermined pitch and having an aperiodic waveform;

delay means adapted to receive and to propagate said audio information;

a plurality of $n$ output terminal means spaced along the delay means, said output terminal means being separated by a duration $\Delta T$;

means adapted to sequentially sample in the direction of propagation of the applied audio information and at a predetermined frequency independent of the waveform of the audio information the increments of the audio information appearing at said plurality of $n$ output terminal means during each sequence of sampling in coincidence with the sampling of said output terminal means whereby a plurality of sampled signals are provided during each sampling sequence and a portion of the audio information equal to $n$ times $\Delta T$ is deleted during each sampling sequence;

said means adapted to sequentially sample including a plurality of interconnected gate means, each gate means having an input line coupled to a corresponding output terminal means, a transfer line coupled to the next succeeding gate means, and an output line coupled to said conversion means;

each gate means being operable to sample an increment of the audio information appearing at the output terminal means coupled to its input line and simultaneously produce a sampled signal at its output line proportional to the sampled increment, and being operable to cause operation of the next succeeding gate means at a predetermined time subsequent to its own sampling operation; and means operable independently of the waveform of the audio information for causing operation of the first one of the plurality of gate means subsequent to operation of the last one of the plurality of gate means whereby a new sampling sequence is initiated; and conversion means adapted to convert said plurality of sampled signals provided during the sampling sequences to output audio information characterized by a pitch lower than said predetermined pitch of said audio information.

References Cited

UNITED STATES PATENTS

| | | | |
|---|---|---|---|
| 2,650,949 | 9/1953 | Veaux | 179—15.55 |
| 3,337,800 | 8/1967 | Halley et al. | 179—15.55 XR |
| 3,348,203 | 10/1967 | Allen | 179—15.55 XR |
| 3,355,554 | 11/1967 | Fuss | 179—15.55 |
| 3,409,744 | 11/1968 | Liberman | 179—100.2 |
| 3,305,785 | 2/1967 | Carroll | 179—15.55 |

KATHLEEN H. CLAFFY, Primary Examiner

D. W. OLMS, Assistant Examiner